United States Patent [19]
Wilson et al.

[11] Patent Number: 4,685,333
[45] Date of Patent: * Aug. 11, 1987

[54] WORK STATION FOR WORKING ON WORKPIECES FOR A PLURALITY OF OPERATIONS

[76] Inventors: Louis D. Wilson, 646 Parkstone Way; Patrick M. Jones, 284 Spencer St., both of Folsom, Calif. 95630; Mark Vrilakas, P.O. Box 561, West Sacramento, Calif. 95691

[*] Notice: The portion of the term of this patent subsequent to Aug. 6, 2002 has been disclaimed.

[21] Appl. No.: 651,176

[22] Filed: Sep. 17, 1984

[51] Int. Cl.4 .......................... G01M 1/04; G01M 1/16
[52] U.S. Cl. ......................................... 73/478; 269/57; 269/81
[58] Field of Search .......................... 73/478, 475–477, 73/466, 473; 269/57, 81

[56] References Cited

U.S. PATENT DOCUMENTS

| 2,043,618 | 6/1936 | Havill | 73/478 |
| 2,130,122 | 9/1938 | Dybvig | 73/465 |
| 2,405,474 | 8/1946 | van Degrift | 73/477 |
| 3,758,098 | 9/1973 | Vrilakas | 269/55 |
| 4,009,612 | 3/1977 | Johnson | 73/480 |
| 4,532,804 | 8/1985 | Wilson et al. | 73/478 |

Primary Examiner—John Chapman
Attorney, Agent, or Firm—Mark C. Jacobs

[57] ABSTRACT

Apparatus for performing work on workpieces, such as automotive drive shafts, comprising a work station having a longitudinally adjustable headstock at one end and a longitudinally adjustable tailstock at the other end. A balancing machine having an off-balance indicator is provided on the work station between the headstock and tailstock for selectively holding a workpiece in a first fixed stationary position for performing work operations thereon and for releasing the workpiece to allow it to oscillate so as to carry out balancing operations thereon.

7 Claims, 10 Drawing Figures

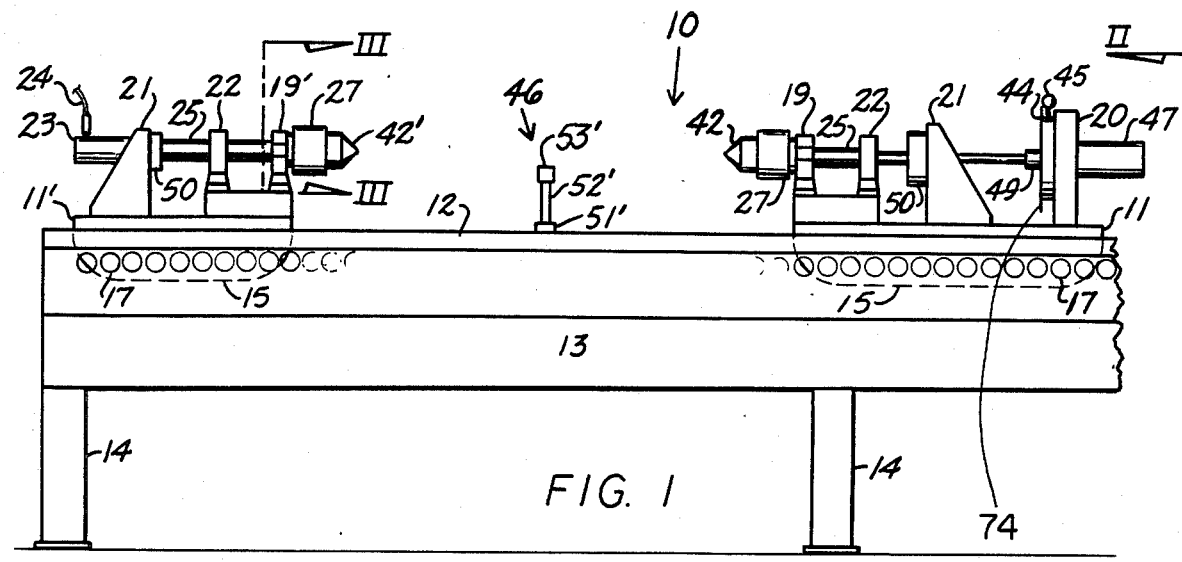
FIG. 1
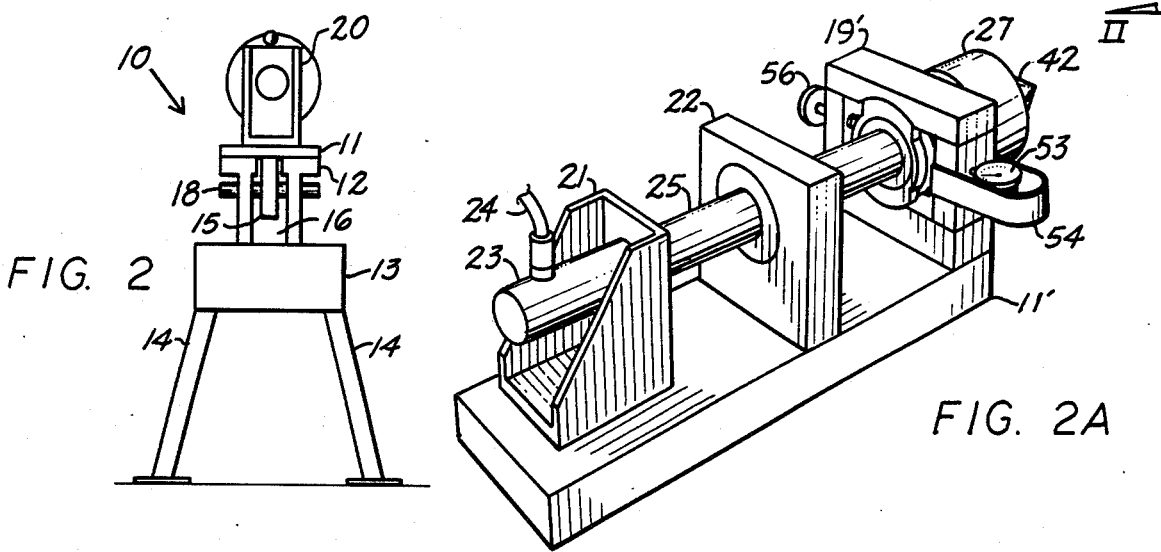
FIG. 2
FIG. 2A
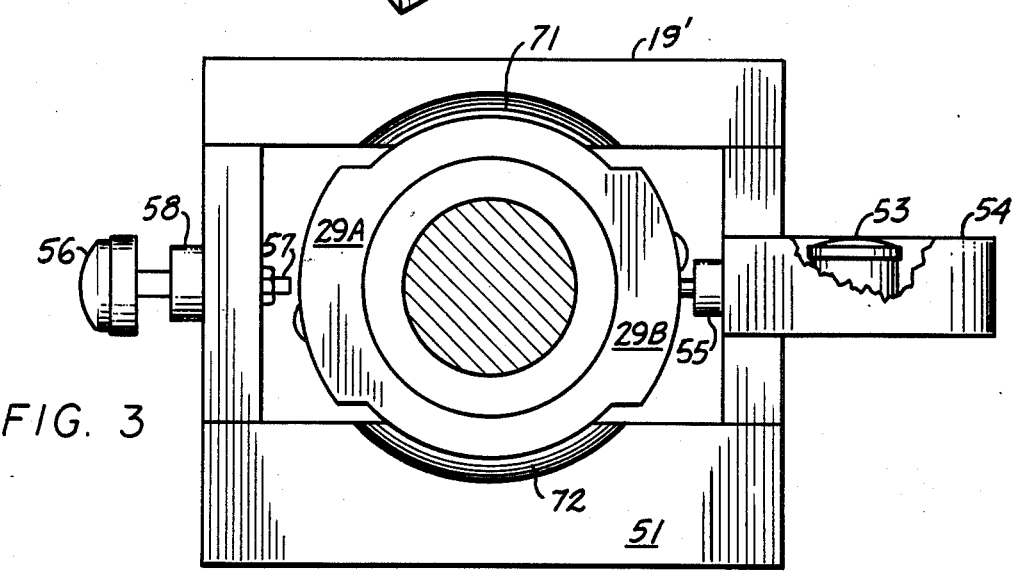
FIG. 3

WORK STATION FOR WORKING ON WORKPIECES FOR A PLURALITY OF OPERATIONS

REFERENCE TO RELATED CASES

The assignee hereof is the owner of co-pending application Ser. No. 536,358 filed 09/17/83 in the name of Wilson and Jones and entitled "Balance Work Support and Chuck", now U.S. Pat. No. 4,545,247; as well as Ser. No. 568,926 filed 01/06/84 for an application entitled "Device for Retaining a Tool in Either A Stationary or Movable Position", said application now U.S. Pat. No. 4,532,804. The disclosure of former Ser. No. 568,926 is incorporated herein by reference.

BACKGROUND OF THE INVENTION

1. Field of the Invention

The invention relates to machines; and more particularly, to a machine for performing work operations on a workpiece.

2. Description of the Prior Art

U.S. Pat. No. 3,758,098, disclosed a machine for performing various operations on drive shafts. In one of the embodiments of the patent, there is disclosed a means for providing a balancer on the same machine to indicate if a drive shaft was out of balance thereby permitting use of conventional balancing techniques to bring the shaft within desired balance limits on the same machine. Although no particular balancer was described in the patent, there is a need for such a device on such machines which is adapted, in one position, to hold a drive shaft firmly in position on the machine so that the operations described therein can be carried out. After such operations, the shaft should be able to be balanced by using the same device which held the shaft in the first position. This is not true of the machine in the patent nor of any such machine in the prior art.

SUMMARY OF THE INVENTION

It is an object of this invention to provide a work station for working on workpieces whereby the workpiece can be selectively held in a fixed position or permitted to oscillate to balance the same.

It is a further object of this invention to carry out the foregoing object at a single work station without need for additional equipment.

It is still another object of the invention to provide apparatus for working on drive shafts for rebuilding, reconstructing and balancing the same in a single work station.

These and other objects are preferably accomplished by providing a work station having a longitudinally adjustable headstock at one end and a longitudinally adjustable tailstock at the other end. A balancing machine having an off-balance indicator is provided on the work station between the headstock and tailstock for selectively holding a workpiece in a first fixed stationary position for performing work operations thereon and for releasing the workpiece to allow it to oscillate so as to carry out balancing operations thereon.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

A fuller understanding of the nature and objects of this invention may be had by reference to the following detailed description and the accompanying drawings.

BRIEF DESCRIPTION OF THE DRAWINGS

FIG. 1 is a vertical view of a work station adapted to be used in a machine for working on drive shafts or the like;

FIG. 2 is a view taken along lines II—II of FIG. 1;

FIG. 2a is a perspective view of the left side of the station of FIG. 1;

FIG. 3 is a rear elevational view of the balancing machine of the work station of FIG. 1 taken along lines III—III.

FIG. 5 is a cross section view of the device of FIG. 4;

DESCRIPTION OF THE PREFERRED EMBODIMENT

Figure 4:
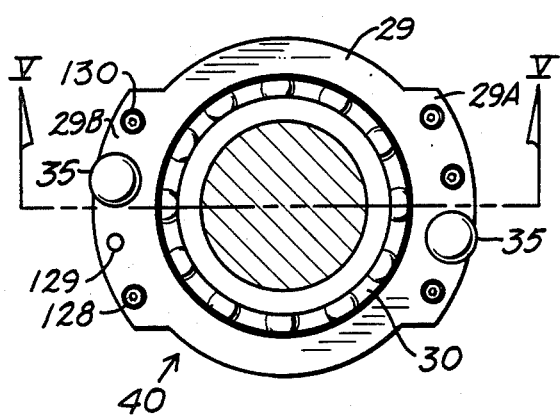
FIG. 4 is a front elevational view of the balancing device of FIG. 3.

Referring now to FIG. 1 of the drawing, a work station 10 is shown having a right work station or base 11 and a left work station or base 11'. Bases 11 and 11' (only base 11 will be described unless otherwise indicated, the bases 11 and 11' being essentially identical in parts thereof) are shown as installed on an elongated bed 12 of a main frame 13, which bed 12 and frame 13, supported by legs 14, is to be understood as being part of a machine for working on drive shafts, as for example, the machine disclosed in U.S. Pat. No. 3,758,098 to Vrilakas. Thus, as indicated in U.S. Pat. No. 3,758,098, the base 11 herein may include a rib 15 (FIG. 2) extending down into space 16 (FIG. 2) having at least one transversely extending opening of the same general size as transversely aligned apertures 17 arranged in an extensive series along frame 13. As discussed in U.S. Pat. No. 3,758,098, the teachings of which are incorporated herein by reference, a bar 18 (FIG. 2) may be inserted into the apertures 17 and openings in rib 15 to lock the base 11 in position. Further, additional clamping means in the form of studs may hold the station 10 in position, such studs working against the surface of base 11. Such studs are not seen in the figures, however. Thus, station 10 can be firmly locked in any desired position.

Referring again to FIG. 1, with regard to both bases 11 and 11' except where otherwise indicated, spaced upstanding self-aligning bearing members 22 are provided on station 10 spaced from each other. As will be discussed, a dynamic balancing apparatus 19 in accordance with the invention is provided on each side of the work station 10. A bracket 21 is mounted on station 10 spaced from member 22. An upstanding flange member 20 (only on base 11) on station 10 is spaced from member 21. The right member 22 and right apparatus 19 form a tailstock 42, also known as a tail centering device, when retaining therein a chuck, 27 as will be discussed; the left members 19 and 22, also with a chuck, 27 therein, form a headstock 42' also known as a head centering device. As can be seen in FIG. 2a, a hydraulic ram or cylinder 23 is mounted in bracket 21 on base 11' coupled by a hydraulic fluid line 24 to a source of hydraulic fluid (not shown). Suitable controls may be provided for actuating cylinder 23 as is well known in the art. For example, a foot pedal arranged as disclosed in U.S. Pat. No. 3,758,098 may be provided.

As also seen in FIG. 2a, a socket chuck 25 is provided extending through bearing member 22 and balancing apparatus 19.

Referring now to FIGS. 3, 4, and 5, there is an assembly 40 held within support member 19' of apparatus 19 which contains a rotatable outer shell or drum 29 which acts as a holder for conventional ball bearings 30 held in place by a retainer ring 31 attached to the shell by use of conventional bolt 32. The ball bearings 30 allow the work piece to rotate by carrying load on the inner race 33 of the ball bearings. The inner race 33 is sized relative to the shaft of the work piece to additionally allow motion to occur along the axis 34 of the ball bearing 30. This feature accommodates rotary motions while allowing freedom of axial motion. The axial motion is used with the outer shell or drum 29 in the locked position to accommodate work piece assembly operations which utilize both rotational and axial motion.

Figure 6:
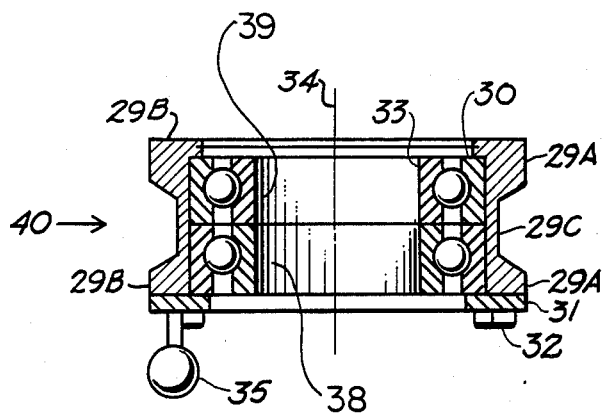
FIGS. 6a and 6b are diagrammatic front views illustrating the operation of a portion of this invention.
Figure 6A:
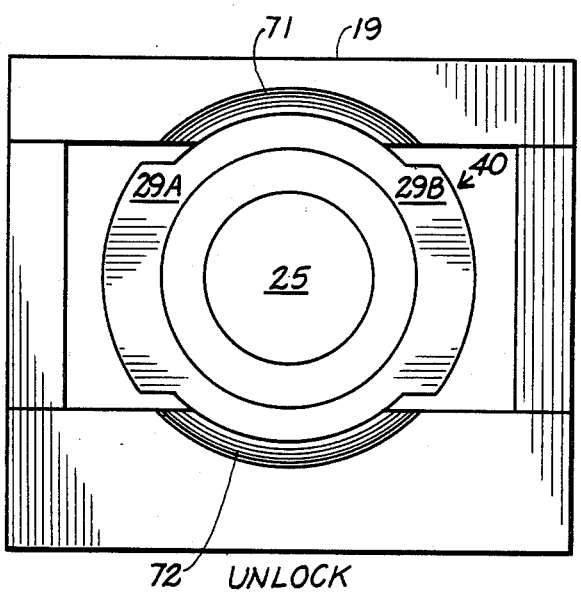
Figure 6B:
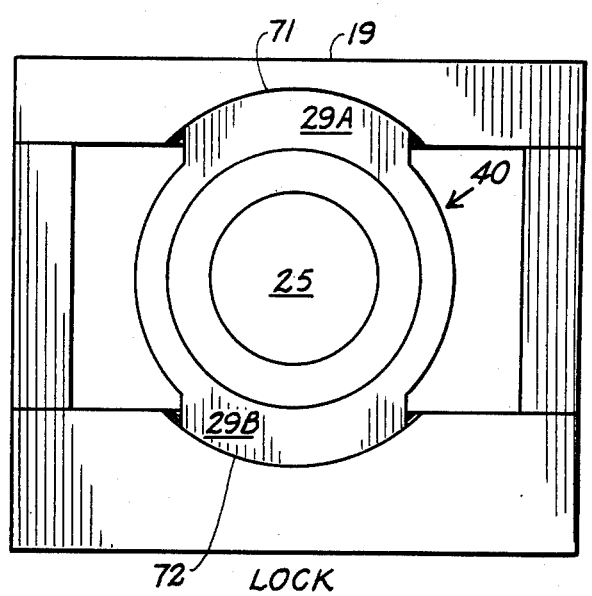

Referring to FIG. 4, it is seen that the outer shell 29 has concentric lobes 29A, 29B which enagage an arcuate recessed zone both in front and behind support 51, the front zone being designated 71, which is seen in FIG. 6B on the outer ring to hold the assembly in a neutral locked position. When rotated ninety degrees (90°) by use of knobs 35 for that purpose, the lobes 29A, 29B of shell 29 disengage from the recessed zones 71 as per FIG. 6A thereby allowing the shell to be supported on portion 29C only by support piece 51 per FIG. 7. When in this position lateral motion is restrained only by gravity force. Unbalance force generated by rotational velocity causes the geometric axis to follow the rotational axis, giving a display of unbalance, as for example on the numeric indicator 74 of FIG. 1, said imbalance being illustrated in FIG. 8. Note that while 29C extends 360°, lobes 29A and 29B are arcs of a large diameter circle portion 29C.

Flange member 20 on base 11 includes a strobe light device 44 (FIGS. 1 and 2) and operating handle 45 therefor, and a conventional motor 47 for rotating the workpiece or chuck 25, of course, suitable controls for operating machine 47 and light device 44 may be provided.

A drive shaft may be supported by the spaced chucks 25 between a apparatus 19. However, apparatus 19 can also be used in other operations and in such operations may be used to hold a workpiece or tool, such as chuck 25, in a first fixed stationary position, or allow the tool to oscillate or float to determine its degree of balance or unbalance. A single apparatus 19 may be used or mating apparatuses 19 retaining the tool or workpiece therebetween may be used.

Figure 7:
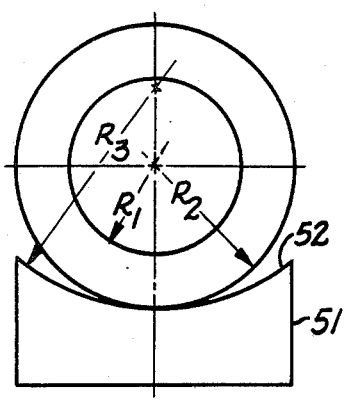
FIGS. 7 and 8 are schematic views illustrating the operating principle of the invention.

Thus, as heretofore described with respect to FIGS. 3 through 5, each apparatus 19 includes an outer shell or drum 29 shown schematically in FIG. 7. The support piece 51 of cage 40 (FIG. 7) is curved at 52 as shown to provide a rocker surface for outer drum 29 the drum having a diameter concentric to the center line of the bearing 30. In FIG. 7, $R_1$ is the radius of inner rotating race of bearing 30, $R_2$ is the radius of curvature of the bearing cage assembly 40 and shell 29C and $R_3$ is the radius of the curved rocker surface 52. This design provides a display of any unbalance to a workpiece extending through bearing 30 or otherwise supported thereby. The amount of motion, and the location thereof, can be measured so that corrective steps can be taken to eliminate any unbalance. Spaced apertures 128 receive shafts 129 and retain said shafts by nuts 130.

Thus the housing assembly 40 has a geometric and mass center, when rotation of the work piece occurs. When the mass and geometric centers are closely coincident, there is an absence of oscillatory motion at a frequency coincident with rotational speed. When significant departures of the geometric and mass centers occur, unbalance forces are generated which cause a following motion to occur. The magnitude of force generated is a function of mass unbalance and the speed, squared. Because of the speed squared relationship, dynamic (rotational) balance is extremely important in all machinery and vehicles. High loads and resultant distress is imparted by the unbalanced rotational member to support bearings and fixtures resulting in excessive wear, distress, and, in many cases, operator discomfort. Because of this fact, it is important to test many rotational members for the presence of unbalance and to provide a means of verifying the fact that corrective steps have been effective.

The rocker bearing support system provided at each member 19 is a novel means for displaying unbalance forces in the form of motion. The rocker bearing support concept uses a conventional ball bearing 30 to support the rotational member 25. The outer races of the double row ball bearings are held in a cage assembly 40. The outer diameter of the cage assembly 40 having shell 29C is supported by an arcuate support having a radius of curvature greater than that of shell 29C. The center of curvature of the support is displaced from the center of the rotational member and cage shown schematically in FIG. 7 wherein the center of radius $R_3$ is shown displaced from the radius centers, lying on a vertical centerline.

These two different radius centers $R_2$ and $R_3$ in effect produce a device that seeks a neutral position through the operation of gravity forces, while letting the bearing cage assembly 40 react to motion imparted by unbalance forces exceeding the force of gravity on the workpiece being balanced. As rotational speed is imparted, a following motion is produced at the rocker bearing support 51 by use of the rocker bearing support 51 in conjunction with a hinged or other support, 22 which is comprised of self-aligning bearings (not seen) which bearings allow controlled oscillatory motion.

Figure 8:
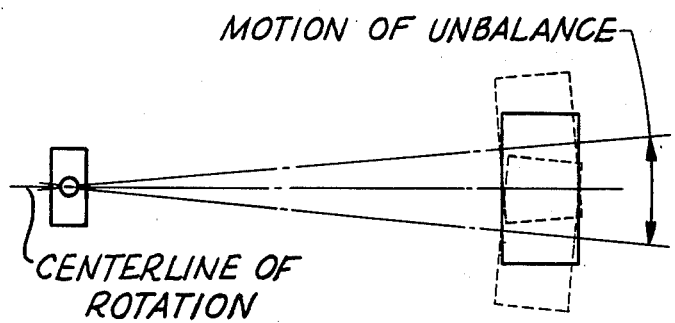

Thus, as shown schematically in FIG. 8, in the horizontal plane the unbalanced workpiece (held in device 19 along the centerline of rotation) provides displacement of the assembly 40 as shown. That is, the normal solid line position shows the drums in the assembly at rest; the dotted line position shows the motion of the drums due to an unbalanced workpiece. The sensitivity to the amount of unbalance may be varied by changing the relationship of the curvatures of the shell 29C and seat 52. Also, the total weight of the wrkpiece being tested for unbalance has no effect on the principle of operation. The apparatus may be proportioned to handle any size of rotating device that might be conceivably tested.

The arrangement disclosed has virtually unlimited load carrying capability and yet can still maintain sufficient sensitivity to produce an adequate balance to the workpiece.

As seen in FIG. 3, a meter 53 is provided on each apparatus 19 secured by a bracket 54 to cage assembly. A probe 55 is coupled to each meter 53. A knob 56 is also provided on the other side of bearing cage assembly 40 having a probe 57 extending through an opening in cage assembly 40 into contact with the outer shell.

The probe 57 is coupled via electrical conduit 58 to strobe light 44 (FIG. 1) to give an indication of where the unbalance motion is on ring assembly 40. That is, knobs 56 are rotated to move probes 57 into contact with shell 29. When the workpiece is rotated and, if unbalanced, motion is transmitted as illustrated in FIG. 8, electrical circuit impulses are transmitted to the strobe light 44 to indicate the location of unbalance. This, as is well known in the art, tells the operator what clock position on the workpiece requires compensating balancing work.

Probe 55 also engages the exterior of shell 29 and measurements, via meter 53, are made of the amount of deflection.

Thus, a workpiece can, in a first position, be mounted in the apparatus 19 and locked in position. After performing any machining operations, the drums are rotated ninety degrees (90°) by use of a hand knob, thus unlocking the workpiece. At this time, any balancing work necessary may be carried out. The unique arrangement allows a workpiece to be worked on with minimum time and effort utilizing a single work station. The set up time is appreciably less than in known prior art arrangements using commercial balancers and all balancing is carried out on the workpiece in the exact manner as it may be operated when in use, such as a vehicle drive shaft.

The shell 29 allows rotation and motion of the workpiece carried in inner bearing 30 (which in turn is seated in a shell 29 of larger radius) to follow motion imparted by any unbalance of the workpiece so that it rocks to and fro until neutralized. By the operator adding weights to the workpiece, as indicated by the strobe light position, as by welding, the workpiece can be balanced. The size of apparatus 19 may be varied to accommodate any size of tool or workpiece.

The socket chuck 25 thus extends through members 19, 22 and into engagement with a collar 49 in operative engagement with light device 44. Suitable thrust pads 50 may be provided as on brackets 21. Headstock 42' on base 11' has its shaft engaging cylinder 23 for actuation thereby to move headstock 42' on base 11' to the right to engage the workpiece (not shown) which is mounted between the headstock 42' and tailstock 42 for the work operation.

If desired, a mounting support 46 (FIG. 1) may be provided between the two stocks 42 and 42' movable along bed 12 and secured in the space 16 between bed 12 by any suitable means. Support 46 has a base flange 51', an upstanding post 52' and a V-shaped support bracket 53'. Thus, the workpiece is adapted to rest on the support bracket 53' and be supported thereby.

The apparatus disclosed herein is thus capable of going from general assembly tooling (as shown in FIG. 1) to balancing means on the same set of components. The work station 10 can be used to work conventionally on a workpiece such as a vehicle drive shaft, as attached to universal joints, then balanced. There is no need to work the piece such as welding, straightening, etc., then remove the piece to a separate work station to perform balancing operations. The balancing operations are carried out at the same work station.

A balance support and chuck which may be used in the arrangement herein is disclosed in my copending patent application Ser. No. 536,358, filed Sept. 27, 1983, entitled "Balance Work Support and Chuck", the teachings of which are incorporated herein by reference.

Although the dynamic balancing apparatus 19 has been disclosed herein in the environment of a work station to carry out operations on a workpiece, such as a drive shaft, the balancing apparatus 19 can be used independently of the work station 10 and this is the subject of my copending patent application Ser. No. 536,358, filed Sept. 27, 1983. The size can be varied to accommodate any size of workpiece.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. In a work station for working on workpieces or the like, having a frame including a support bed, a tailstock having a tall centering device mounted on said support bed, a headstock mounted on said support bed spaced from said tailstock and having a head centering device thereon, and means on said frame for urging said tail centering device to move slidably along the central longitudinal axis through said head centering device with respect to said tailstock and toward said head centering device, the improvement which comprises:

a cage assembly mounted on said work station, a first outer bearing-mounted rotatable drum mounted in said cage assembly; a second inner rotatable drum mounted in said cage assembly coaxially within said first drum, said second drum being adapted to rotate about said axis, and workpiece lock and unlock means associated with both said tailstock and said headstock for selectively locking a workpiece mounted on said work station between said tail and head centering devices for carrying out work operations thereon, and for unlocking said workpiece to allow said workpiece to oscillate or float with respect to said bed; said lock and unlock means being associated with said cage assembly and said drums for locking said drums in a fixed, non-oscillating position;

and said lock and unlock means includes a curved inner lower wall portion having a radius of curvature different from the radius of curvature of the outer drum, said outer drum rotating within the curve of said lower wall portion when said drums are unlocked for oscillation.

2. In the station of claim 1 including strobe means mounted on said work station for determining the movement of the central longitudinal axis of a workpiece of a position coincident with said central longitudinal axis through said tail centering device, and first probe means on said work station coupled to said strobe means adapted to engage said respective tail or head centering device to transmit changes in coincidence of the central longitudinal axis of said workpiece with said central longitudinal axis through said tail centering device to said strobe means.

3. In the station of claim 2 wherein said strobe means is a strobe light electrically coupled to said first probe means.

4. In the work station of claim 3 comprising a pair of cage assemblies having said tail centering device and said head centering device extending therethrough, and said first probe means includes an adjustable probe electrically coupled to said strobe means adapted to engage said respective tail or head centering device to detect oscillation thereof.

5. In the station of claim 4 including second probe means on each of said cage assemblies adapted to engage said respective tail or head centering device to register the degree of oscillation of said respective tail or head centering device.

6. In the station of claim 5 wherein said second probe means is a meter or readout.

7. In a work station for working on workpieces or the like, having a frame including a support bed, a tailstock having a tail centering device mounted on said support bed, a headstock mounted on said support bed spaced from said tailstock and having a head centering device thereon, and means on said frame for urging said tail centering device to move slidably along the central longitudinal axis through said head centering device with respect to said tailstock and toward said head centering device, the improvement which comprises:

a cage assembly mounted on said work station, a first outer bearing-mounted rotatable drum mounted in said cage assembly; a second inner rotatable drum mounted in said cage assembly coaxially within said first drum, said second drum being adapted to rotate about said axis;

workpiece lock and unlock means associated with both said tailstock and said headstock for selectively locking a workpiece mounted on said work station between said tail and head centering devices for carrying out work operations thereon, and for unlocking said workpiece to allow said workpiece to oscillate or float with respect to said bed;

said lock and unlock means being associated with said assembly and said drums for locking said drums in a fixed, non-oscillating position, and wherein each of said lock and unlock means includes curved upper and lower inner wall portions, said outer drum rotating within the curve of said lower wall portion when said drums are unlocked for oscillation; and said cage assembly has protuberances thereon adapted to rotate within the curves of said upper and lower wall portions when said drums are locked in a fixed non-oscillating position.

* * * * *